United States Patent [19]
Verkler et al.

[11] Patent Number: 5,850,517
[45] Date of Patent: Dec. 15, 1998

[54] COMMUNICATION LINK FOR CLIENT-SERVER HAVING AGENT WHICH SENDS PLURALITY OF REQUESTS INDEPENDENT OF CLIENT AND RECEIVES INFORMATION FROM THE SERVER INDEPENDENT OF THE SERVER

[75] Inventors: Jay L. Verkler, Menlo Park; Mark L. Lambert, Atherton; Kenneth L. Harrenstien, Palo Alto; Muhammad Shafiq, El Granada; Larry E. Neumann, San Mateo; Daniel van der Rijn, San Carlos, all of Calif.

[73] Assignee: Oracle Corporation, Redwood Shores, Calif.

[21] Appl. No.: 521,660

[22] Filed: Aug. 31, 1995

[51] Int. Cl.⁶ .................................................. G06F 15/163
[52] U.S. Cl. .......................... 395/200.32; 395/200.33; 395/200.49; 370/401; 370/428; 370/429
[58] Field of Search ........................ 395/200.01, 200.03, 395/200.32, 200.33, 200.09, 200.06, 200.12, 200.2, 200.15; 370/85.13, 401, 428, 429, 463, 253, 397, 468, 384, 312

[56] References Cited

U.S. PATENT DOCUMENTS

| 5,329,619 | 7/1994 | Pagé | 395/200.01 |
|---|---|---|---|
| 5,410,543 | 4/1995 | Seitz et al. | 370/85.13 |
| 5,530,963 | 6/1996 | Moore et al. | 395/200.15 |
| 5,533,026 | 7/1996 | Ahmadi et al. | 370/349 |
| 5,581,596 | 12/1996 | McAfee | 379/57 |
| 5,586,121 | 12/1996 | Moura et al. | 370/404 |

FOREIGN PATENT DOCUMENTS

0483547A1  7/1991  European Pat. Off. .

OTHER PUBLICATIONS

"Wireless data gets the business"; Data Communications, Jan. 1995. Business periodicals ondisc.

"Secure, remote applications for large public networks, Itererant Agents for Mobile Computing"; David Chess et al, IEEE personal Communication Oct., 1995.

"Handling Multimedia Data for Mobile Computers"; Charles E. Perkins IEEE 1996.

*Primary Examiner*—Meng-Ai T. An
*Attorney, Agent, or Firm*—Blakely, Sokoloff, Taylor & Zafman LLP

[57] ABSTRACT

A client-server architecture for use with mobile clients communicating requests through wireless communications. The requests from the client and the subsequent responses by the server are transferred between the client-server connection through an intermediary agent, which operates asynchronously to the client and to the server.

20 Claims, 4 Drawing Sheets

COMMUNICATION LINK FOR CLIENT-SERVER HAVING AGENT WHICH SENDS PLURALITY OF REQUESTS INDEPENDENT OF CLIENT AND RECEIVES INFORMATION FROM THE SERVER INDEPENDENT OF THE SERVER

FIELD OF THE INVENTION

This invention relates to the field of client-server systems; more particularly, the present invention relates to client-server systems having an intermediate agent to coordinate information transfers between a mobile client and a server.

BACKGROUND OF THE INVENTION

In a client-server system, clients make requests which are responded to by a server. In this relationship, the server is passive. In other words, if a client desires data from a database, it makes a request to the server, which only then furnishes the information to the client. After making the requests, the client waits for responses by the server. The server does not initiate interaction with the client on its own. This type of system is commonly referred to as a "pull" data system. In such a system, once a client comes on-line, the client must request information before any is provided to it. There is no automatic sending of information to a client once it has been detected as being on-line. Situations exist where it would be desirable to have information "pushed" out to a client, such as when the client is operating at a remote location and comes on-line. For instance, changes in service orders or plans may occur, such that notification of the client is necessary.

Currently, client-server systems have rarely been expanded for use outside individual business. This limited expansion is due to the dependence of client-server applications on the reliable, high-speed networks found within the business entity (e.g., corporation). As a result, information tools for mobile personnel rarely connect remote users with information that may be critical to their work.

Today, mobile agents outside the boundaries of high-speed corporate networks have communication channels available that typically include wireless networks or phone lines while in the field and local area networks (LANs) while in the office. Both wireless networks and phone lines are orders of magnitude more constrained than traditional high-speed LANs. Table 1 illustrates the dramatic discrepancy between bandwidth (kilobytes per second) and an information transfer between a client and a server on various media, referred to herein as a round-trip.

TABLE 1

| Networks | Bandwidth | Latency |
| --- | --- | --- |
| LAN | 5,000–10,000 kbps | .0005–.001 seconds |
| Circuit Switched Land-Line Modem | 2.4K–28.8 kbps | .2–.5 seconds |
| Wireless WAN | 2K–9 kbps | 4–10 seconds |

As shown in Table 1 above, a round-trip of information between the client and the server takes only 0.0005 seconds on a LAN and only 0.5 seconds on a dial-up network. However, on a wireless network, such a round-trip of information could range from 4 to 10 seconds.

Most client-server applications perform numerous (tens) of round-trips in a single application unit of work. Although this may be easy on a LAN, the many round-trips required for most applications cause a delay to be introduced by a wireless network that is no longer the 4–10 seconds required for a single data round-trip. It is actually 10–50 times longer for each given application unit of work completed. These delays are intolerable to a user. It is desirable to reduce the time necessary to complete round-trips when performing data or information transfers with a wireless network.

Compounding the difficulty of utilizing mobile-based communications in client-server systems, mobile networks disconnect or fade in and out of coverage regularly, neither of which is tolerated by the connection-oriented nature of client-server applications. The client-server system relies on stable connections between the client and the server. If the client and server become disconnected, the client must engage in another log-in sequence and then require the work that was in progress when the connection disappeared. It is desirable to avoid performing log-in sequences every time a client-server connection becomes disconnected.

In summary, today's client-server applications do not work well when applied to mobile communications.

SUMMARY OF THE INVENTION

An architecture for use with a server on a communication medium is described. The architecture of the present invention comprises a client and an agent. The client generates requests for information from the server. The agent is coupled to the client through a mobile communication link. The agent sends the requests to the server on behalf of and independent of the client and receives information from the server in response to the requests. The agent sends the information to the client on behalf of and independent of the server. In this manner, the client and the agent operate asynchronously.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A client-server system is described. In the following detailed description of the present invention numerous specific details are set forth, such as types of communications, types of agents, numbers of handlers, etc. to provide a thorough understanding of the present invention. However, it will be apparent to one skilled in the art that the present invention may be practiced without these specific details. In other instances, well-known structures and devices are shown in block diagram form, rather than in detail, to avoid obscuring the present invention.

Overview of the Present Invention

The present invention provides a client-server system that provides efficient and transparent access to data sources for mobile units. The present invention uses an application messaging infrastructure to allow applications being used in mobile units to support various communication services.

The present invention provides a client-agent-server architecture that enables applications for mobile networks. This architecture allows communication services, such as, for example, wireless, dial-up (e.g., phone lines) and LAN, to be transparently integrated for use by a mobile client. The wireless networks may include radio, infra-red, satellite, paging or any other wireless communications. Furthermore, the present invention provides application-level functionality for each of these communication services. Although wireless networks, phone lines and local area networks are mentioned in the foregoing description, it should be noted that any communication mechanism may be used.

In the present invention, interaction between the various system components occurs asynchronously. In one embodiment, the system functions as an event-driven, store-and-forward system in which applications send and receive information as the user needs it. Note that this is different than the prior art request-response model used in client-server systems. In the present invention, users are able to dispatch a number of jobs (e.g., message transactions) in a network and receive responses as they are completed without having the client interface wait while transactions are processed by an agent (which is described in more detail below).

Architecture of the Client-Agent-Server System of the Present Invention

Figure 1:
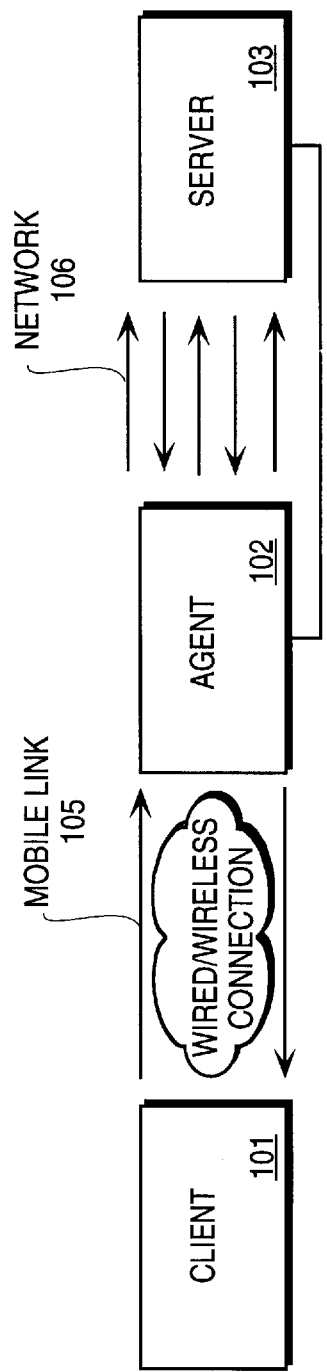
FIG. 1 illustrates the mobile communications client-server system of the present invention.

FIG. 1 illustrates the relationship between client, agent and the server in the present invention. Referring to FIG. 1, client 101 is coupled to agent 102 via mobile link 105. Mobile link 105 may comprise a wired or wireless communications link or some combination of both. Agent 102 is also coupled to server 103 through, for example, network 106 or other direct communications connection.

In one embodiment, client 101 comprises a portable computer system (e.g., lap-top) or other mobile device that runs one or more application programs generating requests that are to be serviced by one or more servers, such as server 103. These requests are communicated to agent 102 for transmission to server 103. In the present invention, communications between client 101 and agent 102 are performed through the use of messages. These messages cause agent 102 to execute tasks and operations on behalf of client 101. In one embodiment, the messages are structured as self-described objects.

In the present invention, client 101 may prompt agent 102 to perform one or more tasks on its behalf, which agent 102 may perform while disconnected from client 101. In such a case, once client 101 is in communication with agent 102 again, agent 102 communicates with client 101 to indicate completion of the requested task. That is, while client 101 and agent 102 are not in communication, agent 102 may perform certain requests, the completion of which may be signaled to client 101 when the two are in communication again.

Agent 102 is interfaced to network 106 and is responsible for interacting with server 103 on behalf of client 103. In one embodiment, agent 102 resides on a LAN at a fixed location. Agent 102 handles all of the "round-trip" information transfers that occur between client 101 and server 103. In one embodiment, agent 102 completes round-trip information transfers to server 103 in 0.005 seconds. By handling all the information transfers between client 101 and server 103, agent 102 shields client 101 from delays that would be attributed to client 101 waiting for a response and that would be attributed to a slow communication network that such a mobile agent would use if interfaced directly to server 103.

Agent 102 is also responsible for transferring information from server 103 to client 101. Agent 102 accepts data from server 103 when it determines that the data is designated for (e.g., addressed to) client 101. When data is sent by server 103, it is accepted by agent 102 on behalf of client 101, and server 103 believes that the response has been made to client 101. In other words, agent 102 "fools" server 103 (and the network 106) into thinking that it is talking to client 101 even though client 101 is communicating over a wireless connection or is not connected at all when information is passed to agent 102.

In one embodiment, the client-server system of the present invention allows the client to receive unsolicited information (e.g., data alerts). Data alerts allow the user to receive information, such as changes to data as they occur, without having to actively request them. Note that this is different than traditional client-server applications which are dependent on the client connecting to a server and then proactively requesting information. When sending a data alert, server 103 sends data addressed to client 101. Agent 102 receives the data on behalf of client 101 from server 103 and thereafter sends the data to client 101. Unsolicited information for client 101 may result from agent 102 querying server 103 for information (e.g., data alerts) on a regular, or irregular, basis and then forwarding responses received from server 103 to client 101.

The server 103 of the present invention comprises sources of data requested by the user. These data sources may include database servers such as Oracle7, various memory sources including files or file servers, other UNIX servers such as file, print or RPC services, facsimile services, on-line servers such as electronic mail, on-line information servers or Windows servers such as customer application or work group servers. It should be noted that the present invention may employ any prior art server as server 103. No changes to such a prior art server are necessary for integration into the client-agent-server system of the present invention.

In the present invention, the interface between agent 102 and client 101 is asynchronous. If client 101 is presently in communication with agent 102 (via wireless or wired network), then agent 102 delivers the information to client 101. However, if client 101 is not presently in communication with agent 102, then agent 102 waits to send the data until client 101 is again connected to agent 102. When this occurs, agent 102 stores the data in a queue until agent 102 determines that client 101 is again connected to agent 102. This determination may be made by polling client 101 repeatedly after a predetermined period of time (e.g., every 5 minutes) to determine if client 101 is within range. In another embodiment, client 101 may signal agent 102 when it determines that it has been out of communication range and is now back in range. In an alternate embodiment, network 103 may inform agent 102 or client 101 that client 101 is in communication with the system.

The present invention accommodates suspended and/or disconnected operations due to marginal or no communications. While disconnected, all user initiated messages are queued for sending later, both by client 101 and agent 102. When communications are reinstated, any queued messages are automatically sent. Note that this is of particular importance when using packet radio networks or phone lines. If a user is temporarily out of range of the radio and then comes back within range, then the messages automatically begin to flow (without a log-on sequence). Similarly, if the phone line drops during a modem or cellular modem connection, an application can reconnect and pick up where it left off, with all the work being preserved. Note that reconnection does not entail setting up a communication session because client 101 and agent 102 employ "sessionless" communication in that agent 102 is always on and responsive to client 101 as soon as client 101 is within range.

Figure 2:
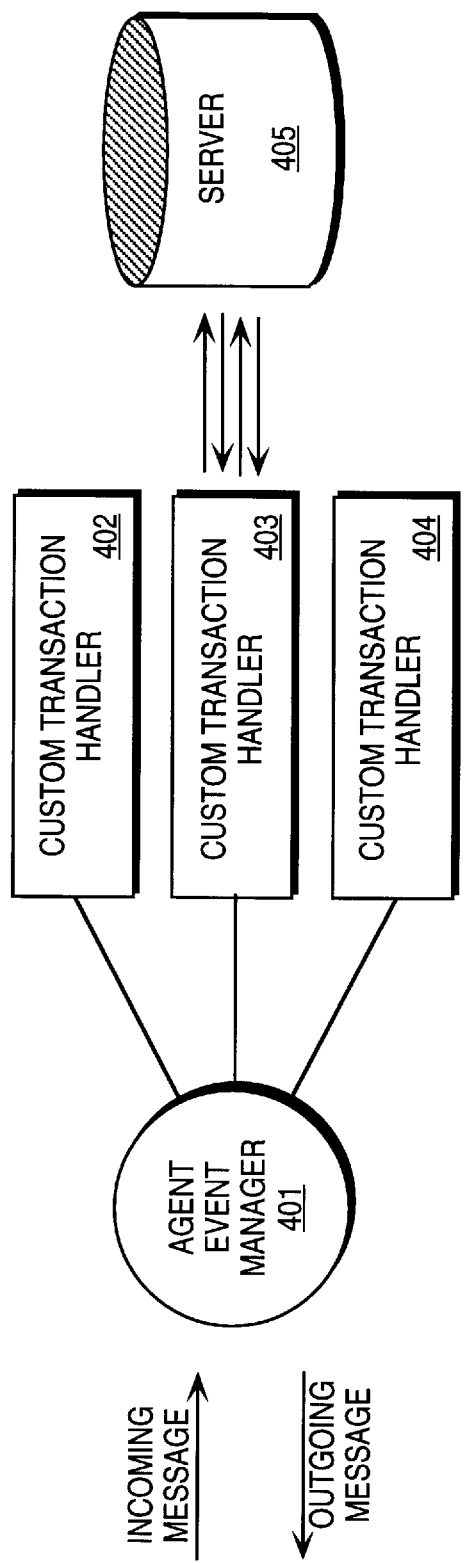
FIG. 2 illustrates one embodiment of the client-agent-server system of the present invention.

FIG. 2 illustrates one embodiment of a client-agent-server system of the present invention. Referring to FIG. 2, client 201 is shown having client application programs 201A–201C and a message manager 201D. Note, client 201 may include more or less application programs than shown in FIG. 2. In one embodiment, application programs 201A–201C and message manager 201D comprise a client computer system. Message manager 201D resides below client applications 201A–201C and the operating system (e.g., Windows, etc.) and coordinates message transfer between client applications 201A–C and mobile link 205. In other words, message manager 201D manages communications for all applications of client 201.

Mobile link 205 may comprise either wired or wireless communication, or both. Mobile link 205 is also coupled to message gateway 204, which is coupled to agents 202A–C using, for instance, a network LAN. Agents 202A–C are also coupled to servers 203A–C, respectively, through one or more networks (or other communication facility).

In one embodiment, agents 202A–C, servers 203A–C and message gateway 204 may reside on single or separate machines. Agents 202A–C reside as close as possible to servers 203A–C, respectively. In one embodiment, agent(s) may be directly on a server. Message gateway 204 may reside on another computer system coupled to the network.

Client applications 201A–201C generate requests for information and direct their request to servers 203A–C. The requests are sent as messages from client 201 to message gateway 204 via message manager 201D. In one embodiment, the messages carry structured data between clients (e.g., client 201) and agents (e.g., agents 202A–C). Requests are initiated on client 201 by creating a message, identifying the message contents, and issuing a send command to pass it to one of agents 201A–C.

Message manager 201D receives messages from all client applications 201A–C and delivers them over the currently available communications link. In one embodiment, message manager 201 resides with client applications 201A–C on client 201 and operates identically over wireless networks, phone lines, or local area networks.

Messages from client applications 201A–C are sent from message manager 201D to message gateway 204 for forwarding onto an application agent (e.g., agent 201A–C) and, eventually, to servers 203A–C. Messages are also sent from message gateway 204 to message manager 201D for forwarding onto client applications 201A–C. That is, in one embodiment, message manager 201D may receive data sent from one of agents 202A–C via message gateway 204 for one of client application programs 201A–201C. Therefore, message manager 201D and message gateway 204 operate together to guarantee the data sent over mobile link 205 is sent successfully, securely and with the integrity of the context in tact. Note that there may be multiple message gateways in the system for use with multiple agents.

In one embodiment, message manager 201D interfaces to message gateway 204 asynchronously. In other words, once client applications 201A–C have generated requests, message manager 201D may forward those requests at any time. If client 201 is "disconnected" from message gateway 204, then message manager 201D does not have to attempt to send the requests. In one embodiment, message manager 201D forwards the requests if client 201 is within range of message gateway 204. Message manager 201D includes a message queue to provide "disconnected" operation between client 201 and agents 202A–C. The message queue stores messages that are to be sent to agents 202A–C until client 201 is able to communicate with message gateway 204 again (e.g., client 201 is turned on or client 201 comes within communition range of gateway 204).

Because of their asynchronous operation, message transfer between message manager 201D and message gateway 204 is performed with handshaking to send and acknowledge each message being transferred. When acknowledgements are not returned, the sending party determines that the message transfer has been unsuccessful and, in one embodiment, stops attempting to complete the transfer after a predetermined period of time.

In one embodiment, message manager 201D is capable of communicating with message gateway 204 by wired or wireless communications. That is, message manager 201D comprises multiple communication facilities that allow client 201 to both send and receive messages to and from message gateway 204 over a variety of media.

Message gateway 204 performs multiple functions. First, message gateway 204 simultaneously manages clients on wireless, dial-up and LAN protocols, as well as all network services (e.g., agents). Message gateway 204 tracks all incoming and outgoing traffic from client 201 and attempts to locate client 201 when data is to be sent to client 201. If unable to do so, message gateway 204 waits until client 201 sends it a message indicating that client 201 is on-line or is polled and a determination is made that client 201 is ready to receive communications. Second, message gateway 204 provides system message queuing and management. The queuing of message gateway 204 allows for storage of messages when client 201 cannot be located and allows stored messages to be forwarded when client 201 is in communication with message gateway 204 (e.g., client 201 is on and is within range).

In one embodiment, message gateway 204 also handles the configuration, registration, naming and security aspects of the communications in the system. Message gateway 204 may handle multiple agents on the same or different networks. Each of these functions is described in more detail below.

As discussed above, message gateway 204 forwards messages to application-specific agents 202A–C, which thereafter complete client application requests on behalf of client 201. Agents 202A–C forward data and information to client 201 via message gateway 204.

An Exemplary Client of the Present Invention

Figure 3:
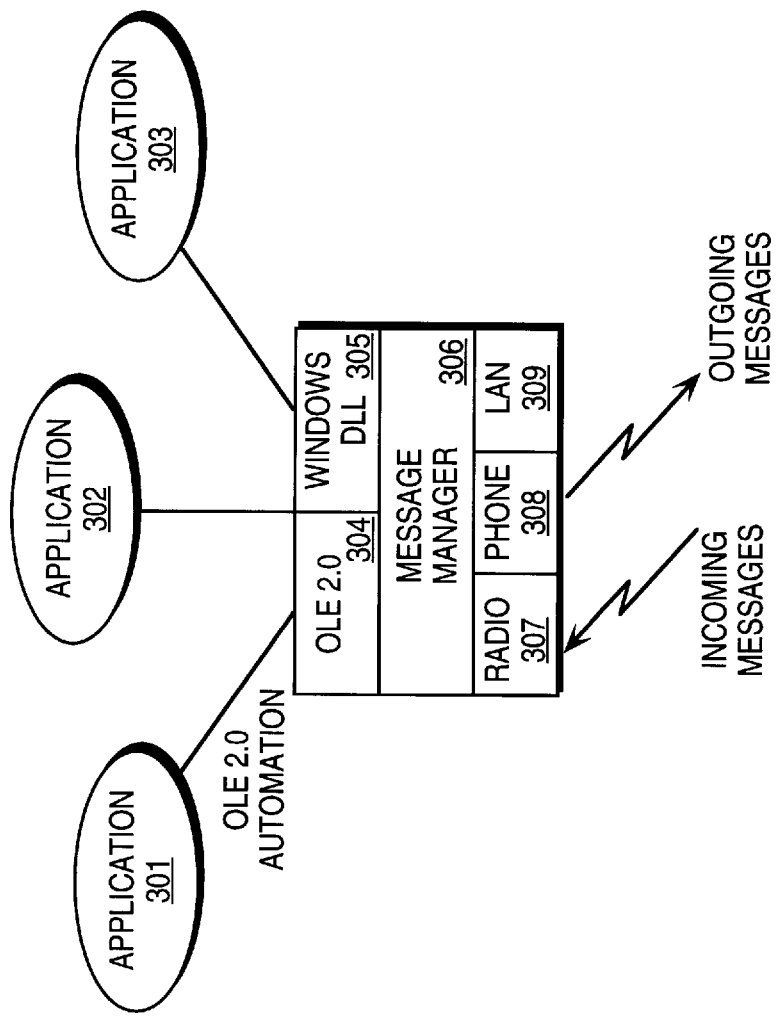
FIG. 3 illustrates one embodiment of a client according to the teachings of the present invention.

One embodiment of client 201 is shown in FIG. 3. Referring to FIG. 3, client applications 301–303 pass structured data directly from objects and instructions of a native programming environment to message manager 306 through the use of a message transfer layer comprising, for instance, OLE 2.0 automation 304 and/or Windows DLL 305. This allows it to communicate with all standard Windows applications. For example, in Microsoft Windows, a Visual Basic application can put and take data directly from screen fields of messages of the present invention. Thus, the present invention uses OLE 2.0 or any self-describing object-orientated communication mechanism for application to message manager inter-application communication and presentation.

OLE 2.0 performs marshalling for messages being sent to an agent in the system and unmarshalls messages received from agents. Underneath that programming model, message manager 306 determines the data type of the field and converts it appropriately for use around the network. In this manner, the client sends self-described messages.

Because the messages are self-described, they may be transferred to and from various systems employing different operating systems and protocols. Further, this allows messages to be queued or subject to multiple different transports. Note that the messages may be defined to indicate their originating system and/or their destination system.

Messages received by message manager 306 are output from client 301 using communications functionality, such as wireless (e.g., radio) 307, phone lines 308 and/or LAN 309, which interface to message manager 306. That is, users have access to message gateway 204 through any of these types of communications. Message manager 306 includes the driver and any necessary functionality to support each of these communication functionalities. Each of the communications drivers are supported through their native interfaces. For instance, LAN support is through the international standard TCP/IP using sockets interface. Phone line modems are supported to the open asynchronous standard point-to-point protocol (PPP). Packet radio networks are supported through native published interfaces. In one embodiment, the international standard mobitex interface to the RAM Mobile Data network is used.

In one embodiment, the present invention allows the user to change communication links. The user may change communication links based on any number of criteria, such as which is most appropriate at communications available between the client and message gateway at that time. For instance, while a user may use packet radio technology for communication while out in the field or when mobile, the user may desire to use a LAN connection when in the office. In one embodiment, the user changes communications link by selecting the desired communication link from a list in a menu (e.g., pull-down menu, pop-up window, etc.) or by, for instance, clicking a button. Note that the change in communication services is performed independent of and without knowledge to application programs running on client.

In one embodiment, message manager 306 also functions to receive data sent from an agent via message gateway for one of client application programs 301–303. The destination client application need not be running for the message to be received. Which causes the application manager 306 causes the application program to be run. In one embodiment, messages may include a "trigger" instruction that automatically launches an application and causes the application to perform one or more functions, such as displaying the information sent to client 300.

The Message Gateway

In one embodiment, message gateway 204 performs four main functions. Message gateway 204 forwards messages from mobile users to their agents and vice versa. Message gateway 204 also queues messages intended for a client, such as client 201 or agent, such as agents 202A–C, that are out of coverage, turned off, or otherwise unavailable (e.g., dead). Message gateway 204 also contains all the system-level component configuration information. Configuration information allows all components to be self-configuring to reduce the risk of installation and user errors. Message gateway 204 may also apply system security through user password encryption and message authentication. Password encryption and message authentication are well-known in the art.

The present invention provides automatic configuration of agents and clients. In one embodiment, all agents and clients register with the message gateway. The message gateway maintains all configuration information for the system in a registry. When an agent, user or application require system details, they can be looked up in the message gateway. This eliminates most of the user-errors many products encounter when configuration and data is entered in many places. Furthermore, it additionally shields the mobile worker from many of the details of the system.

To the end-user, installation configuration can be as simple as clicking on an installer. In such a case, a client would send a request to the message gateway to determine what is required for the use of a particular application. The message gateway would respond by either indicating the requirements of such an application or providing a fail message. These requests include a globally recognized ID (e.g., a transport address), the location of the application and how such an application is requested in the system. In response to the fail message, the client would not engage the application.

Note that the present invention may use compression of data during transmission to increase system throughput, particularly over wireless links.

In one embodiment, the message gateway of the present invention also provides for automatic detection of when a client resumes communication with the gateway. After communication between a client and the message gateway has been discontinued and is being resumed, the gateway is able to automatically determine when a client is again within communication range or is able to communicate with the gateway without polling. In one embodiment, when a client desires to resume communication with an agent, via the message gateway, the communications functionality, such as a radio, generates an event (e.g., signal(s), flag, etc.) unknown to applications of the client to indicate the presence of the client to the network and server. Such events are well-known in the art. After the event has occurred and communication resumes, any messages that were left with the network or the client may be delivered. In this manner, the present invention performs events-based notification to resume communication.

In one embodiment, the message gateway of the present invention also performs automatic load balancing during which the gateway automatically distributes requests to multiple agents, one request at a time based on whether or not a particular agent is busy. If multiple agents are capable of performing the same function and one of the agents is less busy than the other, the message gateway is able to distribute a request to the agent that is more able at the time to handle the request. Note that in the present invention, a variety of load balancing algorithms may be used. For instance, the gateway may monitor the queues of the agents and determine which agent has the smallest queue. Upon such a determination, the gateway would then forward such a request to the agent with the smallest queue. In another embodiment, the message gateway may also be able to exchange traffic to ensure all agents are equally loaded.

It should be noted that a single agent may also interface to multiple servers and perform load balancing by itself to ensure the servers are loaded substantially equally to perform multiple services in parallel. Note that this only applies where servers are all capable of satisfying the same requests.

In one embodiment, the gateway of the present invention also performs service-based routing in which the client is able to send requests to the message gateway without knowing the actual network address of the agent. In response to the message, the gateway examines the type of agent that is desired by looking at the message and locates an agent that is capable of handling this type of message. The gateway may look at its registry to find such an agent. Once located, the gateway sends the request to that agent to be performed.

In one embodiment, the present invention also includes the ability to allow messages to be redirected over different media when a client, upon resuming communication with the message gateway, has changed its location on the communication media. This is referred to herein as dynamic address rebinding and operates because the addressing that is employed by clients in the system is not based on network addresses. The present invention is able to redirect messages to a client even though the client has changed its communications location much like the user of a telephone when a user switches between telephones having different numbers yet is still recognizable to the individual on the receiving end. This even applies to where the client has actually changed communication hardware and software that it employs to perform such communication (e.g., changed modem types). In one embodiment, in order to perform this functionality, the message gateway maintains a list of the last known address of each client. In one embodiment, queues are stored with an abstract ID of the client. When a client makes itself known again to the message gateway, by its ID, the message gateway rebinds its address and thereafter sends the messages to the client.

Agents of the Present Invention

Figure 4:
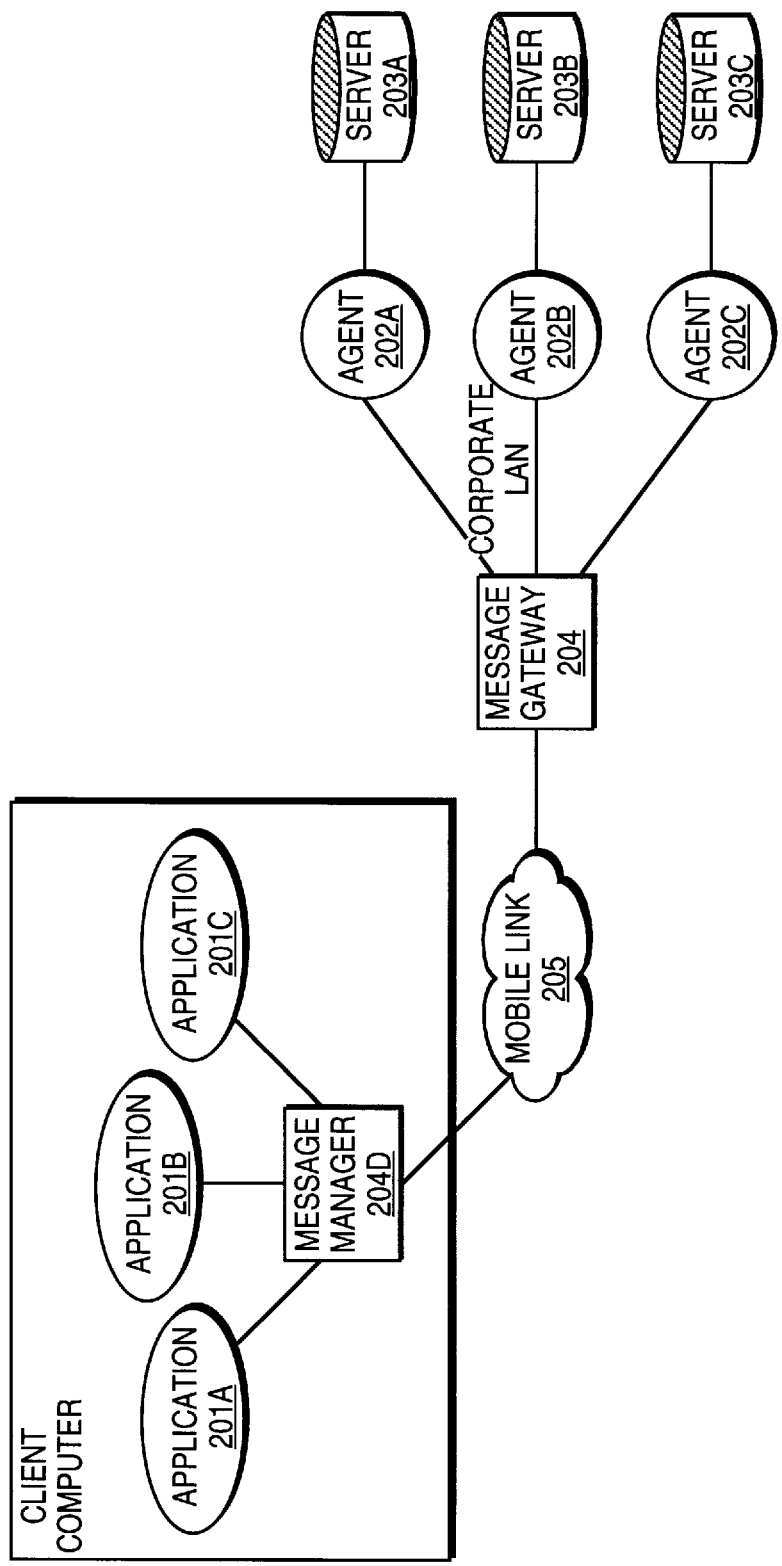
FIG. 4 illustrates one embodiment of an agent according to the teachings of the present invention.

In one embodiment, each agent comprises a program having an agent event manager and custom written handlers, such as shown in FIG. 4. Referring to FIG. 4, agent event manager 401 handles messages and events for agent 400. Agent event manager 401 handles messages by running one of message handlers 402–404. Agent event manager 401 is responsible for communicating with message gateway 204 (FIG. 2) to send and receive messages and determine what action should occur in response to a message. In one embodiment, agent event manager 401 comprises software running on a computer system. Custom transaction handlers 402–404 are coupled to agent event manager 401 and each is designed to handle at least one distinct transaction that a client applications (e.g., applications 201A–C) initiates. Each of handlers 402–404 interpret the specific message, perform some function based on the message contents, and return a response. Agent events can also be initiated by timers or other local system events.

In an alternate embodiment, one agent event manager provides access to only one handler.

In one embodiment, an agent comprises an application program, or application server, written using a native application environment. Agents can be written to use a variety of interfaces that may include C/C++, Oracle OCI and PRO*C, Microsoft Visual Basic, and PowerSoft PowerBuilder. In the present invention, agents access servers using native interfaces to that server. For example, Oracle7 is accessed using the Oracle PRO*C or OCI interface on UNIX, while on Windows, the same interfaces as well as Oracle Glue or ODBC are available.

Examples of agents may include an order-status agent, a support call tracking agent, and a stock portfolio manager. Each is described in more detail below.

In one embodiment, an order-status agent performs standard query, insert and update functions in conjunction with a database to manage sales orders. The order-status agent may also regularly check all open orders against inventory levels to alert a field representative and inventory manager of increased demand or shortages. In the present invention, mobile devices can be notified of data changes impacting their orders, even if the user has not accessed the order system in an extended period of time.

In one embodiment, a support call tracking agent manages call entry and update for field support engineers. Additionally, the support call tracking agent may identify priority customer problems as they occur and automatically forward the details along an escalation path. Furthermore, in one embodiment, this agent may automatically send the customer contact internet e-mail updates with the call's status and the individuals resolving the problem as data changes.

In one embodiment, a stock portfolio manager allows users to access real-time stock quotes as well as the current value of their personal portfolios for their mobile computer. Additionally, for any stock, buy and sell limits can be set up to either alert the user to points of interest, or to automatically execute trades via on-line trading gateways.

Multiple Gateways and Multiple Networks

In the present invention, mobile devices can communicate simultaneously with multiple gateways, on completely separate systems. For instance, information services may provide agent applications that co-exist with corporate applications. For instance, an on-line travel service application can simultaneously receive updates to information from one gateway, while corporate applications receive data from another gateway. Prior art systems only allow connection to one system at one time.

In one embodiment, multiple gateways and multiple networks are supported by having addresses that are used to route message around the system include a network name to ensure that information is sent properly. Also, applications may register themselves indicating what network they are on or with which network they operate.

In summary, the system of the present invention provides transparent agility between wireless, dial-up, and LAN systems. This enables users to employ the most efficient networks available at a particular time. The overall transaction performance is maximized by reducing the use of a communication link of a mobile client and taking advantage of the high speed link between the agent and the server.

One advantage of the present invention is that it provides a client-server system with increased speed while using wireless networks. Asynchronous interfaces permit applications to function while data requests are pending, to provide store-and-forward queues, and ensure reliability when not connected.

The client and server interfaces are open, permitting customers to select the most appropriate tools to complete a task. The system includes automatic configuration of registration, thereby providing a virtual "plug-and-play" system.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of various embodiments are not intended to limit the scope of the claims which in themselves recite only those features regarded as essential to the invention.

Thus, a client-agent-server system has been described.

We claim:

1. An architecture for client-server communication over a communication link, the architecture comprising:
    a client that generates a plurality of requests for information, the client including:
        at least one application that generates the plurality of requests when running;
        a message interface operating in conjunction with the at least one application to format requests into messages;

a message manager operable with said at least one application to coordinate transfer of requests between the client and the agent;

an agent coupled to the client through a communication link and coupled to the communication medium, the agent including:

at least one handler, wherein each of the at least one handler performs at least one transaction in response to the plurality of request; and an event manager that transfers each of the plurality of requests to the at least one handler, wherein the agent sends the plurality of requests to the server on behalf of and independent of the client and receives information from the server responsive to the plurality of requests, wherein the agent sends the information to the client on behalf of and independent of the server, such that the client and the agent operate asynchronously.

2. The architecture defined in claim 1 wherein a gateway is linked to the agent and the client and the message manager forwards the plurality of requests from the client to the gateway at any time.

3. The architecture defined in claim 2 wherein the message manager comprises a queue for storing messages prior to sending the messages to the gateway.

4. The architecture defined in claim 1 wherein the agent continues to operate on behalf of the client while the client is disconnected from the agent.

5. The architecture defined in claim 4 wherein the agent stores information to be forwarded to the client when the client is not available to the agent.

6. The architecture defined in claim 1 wherein the message manager comprises communications drivers and a plurality of communications hardware.

7. The architecture defined in claim 1 wherein the message interface layer comprises OLE 2.0.

8. The architecture defined in claim 1 wherein the message interface layer comprises an object-level interprogram interface.

9. The architecture defined in claim 1 wherein the message manager comprises a queue to store requests to be sent to the server while the client not communicating with the agent.

10. The architecture defined in claim 1 wherein the agent sends at least one of the plurality of requests to the server while no longer communicating with the client.

11. The architecture defined in claim 1 wherein each of the plurality of requests is communicated as at least one self-described object.

12. The architecture defined in claim 1 wherein the agent accepts unsolicited information from the server on behalf of the client and forwards the unsolicited information to the client.

13. The architecture defined in claim 1 wherein the message manager comprises a selection mechanism that allows a user to select a type of the communication link independent of at least one application programming running on the client.

14. The architecture defined in claim 1 wherein a gateway is linked to the agent and the client, the gateway maintaining a registry of agents and clients and providing system information in response to requests by the client and the agent.

15. The architecture defined in claim 1 wherein the message manager allocates buffer memory as messages are received by linking segments of memory that are a predetermined size to a buffer size necessary to store the messages.

16. The architecture defined in claim 1 wherein a gateway is linked to the agent and the client and the gateway performs automatic load balancing.

17. The architecture defined in claim 1 wherein a gateway is linked to the agent and the client and the gateway performs service-based routing.

18. The architecture defined in claim 1 wherein a gateway is linked to the agent and the client and the gateway identifies the client after the client changes locations on the communication link by rebinding the address of the client.

19. The architecture defined in claim 1 wherein a gateway is linked to the agent and the client and the gateway queues messages designated for the client or the agent when unavailable.

20. The architecture defined in claim 1 wherein the communication link is a mobile communication link.

* * * * *